US012630057B2

(12) United States Patent
Obadia et al.

(10) Patent No.: US 12,630,057 B2
(45) Date of Patent: May 19, 2026

(54) METHOD FOR DETECTING WEAR OF SEAT CUSHION AND DETECTION DEVICE THEREFOR

(71) Applicant: Safran Seats, Plaisir (FR)

(72) Inventors: Jean-Marc Obadia, Moissy-Cramayel (FR); Lisandre Marcovici-Soulage, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 286 days.

(21) Appl. No.: 18/267,087

(22) PCT Filed: Dec. 16, 2021

(86) PCT No.: PCT/FR2021/052352
§ 371 (c)(1),
(2) Date: Jun. 13, 2023

(87) PCT Pub. No.: WO2022/129795
PCT Pub. Date: Jun. 23, 2022

(65) Prior Publication Data
US 2024/0051434 A1 Feb. 15, 2024

(30) Foreign Application Priority Data
Dec. 16, 2020 (FR) ...................................... 2013385

(51) Int. Cl.
| | |
|---|---|
| *B60N 2/00* | (2006.01) |
| *B60N 2/02* | (2006.01) |
| *B60N 2/07* | (2006.01) |
| *G01B 7/00* | (2006.01) |

(52) U.S. Cl.
CPC ......... *B60N 2/0021* (2023.08); *B60N 2/0272* (2023.08); *B60N 2/0727* (2013.01); *G01B 7/003* (2013.01); *B60N 2/002* (2013.01); *B60N 2210/14* (2023.08)

(58) Field of Classification Search
CPC .. B60N 2/0272; B60N 2/002; B60N 2210/14; B60N 2/0021; B60N 2/0727; G01B 7/003
USPC ...................................................... 297/217.2
See application file for complete search history.

(56) References Cited

U.S. PATENT DOCUMENTS 10,829,220 B2* 11/2020 Sidambarom ........ B60N 2/0244
2018/0319503 A1 11/2018 Sidambarom et al.

FOREIGN PATENT DOCUMENTS

DE 102019203979 A1 9/2020
FR 3085812 A1 3/2020
WO 2017076518 A1 5/2017

OTHER PUBLICATIONS

International Patent Application No. PCT/FR2021/052352, International Search Report (and translation) and Written Opinion, dated May 2, 2022.

* cited by examiner

*Primary Examiner* — Milton Nelson, Jr.
(74) *Attorney, Agent, or Firm* — Kilpatrick Townsend & Stockton LLP

(57) ABSTRACT
Disclosed is a method for detecting the wear of a cushion of a seat or a backrest of a seat, comprising determining the state of wear of the cushion according to a predetermined minimum threshold value of the thickness of the cushion below which the cushion is considered to be worn.

7 Claims, 3 Drawing Sheets

DETERMINING THE STATE OF WEAR OF THE CUSHION ACCORDING TO A COMFORT THRESHOLD WHEN THE PRESENCE OF A PASSENGER IS DETECTED ON THE SEAT — 100

DETECTING A LOADED CUSHION THICKNESS LESS THAN THE COMFORT THRESHOLD — 200

SENDING AN INSTRUCTION TO REPLACE THE CUSHION — 300

METHOD FOR DETECTING WEAR OF SEAT CUSHION AND DETECTION DEVICE THEREFOR

CROSS REFERENCE TO RELATED APPLICATIONS

This application is the United States national phase application of International Patent Application PCT/FR2021/052352 ("the '352 application") filed on Dec. 16, 2021, and titled "METHOD FOR DETECTING WEAR OF SEAT CUSHION AND DETECTION DEVICE THEREFOR," which application is related to and claims priority benefits of France Patent Application No. 2013385 ("the '385 application") filed on Dec. 16, 2020. The '352and '385 applications are hereby incorporated in their entireties by this reference.

TECHNICAL FIELD

The present invention relates, generally, to predicting the wear of a seat, in particular the wear of the cushion of a seat.

More specifically, the invention relates to a method for detecting the wear of a cushion of a seat and to an associated detection device, incorporated in the seat.

In an aircraft, passengers' comfort during the flight is an essential consideration for airlines.

To ensure comfort, it is judicious to predict the wear of the cushion of the seats whereon the passengers travel, i.e., determine when the seat no longer fulfils this function in order to envisage the replacement thereof.

PRIOR ART

Known devices, particularly in the automotive field, make it possible to detect the presence of a passenger on a seat. For example, a pressure sheet is positioned on the top face of the cushion and the resulting pressure peak analysis makes it possible to infer whether an individual is sitting on the seat or not.

Nevertheless, no existing technology makes it possible to autonomously detect the wear of the cushion disposed on the seat or the backrest of a seat. The wear thereof, i.e., the collapse thereof which occurs over time resulting in a reduced thickness, is therefore observed by verification of the airline cabin or maintenance crew, or by the passenger themselves reporting their discomfort.

The verification of each seat of an aircraft proves to be lengthy and laborious and must be regularly repeated.

In addition, the ad hoc nature thereof can result in the wear of a seat being observed in a delayed manner, not ensuring continuous passenger comfort.

PRESENTATION OF THE INVENTION

Therefore, the aim of the invention is that of remedying these drawbacks and proposing a simple and autonomous method for detecting the wear of the cushion of a seat.

Therefore, a method is proposed for detecting the wear of a cushion of a seat or a backrest of a seat, comprising determining the state of wear of cushion according to a predetermined minimum threshold value of the thickness of the cushion below which the cushion is considered to be worn.

Advantageously, determining the state of wear of the cushion comprises detecting an element to be detected disposed in the cushion at a distance from a sensor indicating a cushion thickness less than the predetermined minimum threshold value, and therefore a collapse of the cushion.

Preferably, determining the wear of the cushion is carried out when the presence of a person on the seat is detected.

According to an embodiment, the element to be detected is a magnet and the sensor is a sensor sensitive to the magnetic field of the magnet and reacting according to the proximity of the magnet, the sensor being capable of being used according to a first detection level to detect the presence of a passenger on the seat, and according to a second detection level to detect the wear of the cushion according to the value of the magnetic field corresponding to the distance between the magnet and the sensor.

According to a feature, the method can comprise sending an item of information signaling that the cushion is worn when a thickness value of the cushion less than a predetermined minimum threshold value is detected in a predetermined time interval, such as one day.

The invention also relates to a seat comprising a cushion of a backrest or a seat of the seat and a device for detecting the wear of the cushion, the detection device including means for determining the thickness of the cushion according to a predetermined minimum threshold value of the thickness of the cushion below which the cushion is considered to be worn.

Advantageously, the means for determining the thickness of the cushion include a sensor capable of detecting when an element to be detected disposed in the cushion is at a distance from a sensor indicating a thickness of the cushion less than the predetermined minimum threshold value, and therefore a collapse of the cushion.

According to an embodiment, the element to be detected is a magnet and the sensor is a sensor sensitive to the magnetic field of the magnet and reacting according to the proximity of the magnet.

According to an embodiment, the determining means can be configured to detect the presence of a passenger on the seat according to a first detection level, and to detect the wear of the cushion according to a second detection level according to the value of the magnetic field corresponding to the distance between the magnet and the sensor. The same sensor then makes it possible, via different detection levels, to detect the presence of a passenger on the seat and the wear of the cushion.

According to an example, the sensor is a Hall effect sensor.

According to another embodiment, the element to be detected is a mechanical part and the sensor is an electromagnetic sensor reacting according to the proximity of the mechanical part.

According to a feature, the sensor can be fastened at the seat of the seat.

Preferably, the device for detecting the wear of the cushion comprises means for detecting the presence of a person on the seat, the operation of the means for determining the thickness of the cushion being dependent on the presence of a person sitting on the seat.

The invention also relates to an aircraft including one or more seats as described above.

BRIEF DESCRIPTION OF THE DRAWING

Further aims, advantages and features will become apparent from the following description, given merely by way of illustration and with reference to the appended drawings wherein.

DETAILED PRESENTATION OF AN EMBODIMENT

Figure 1:
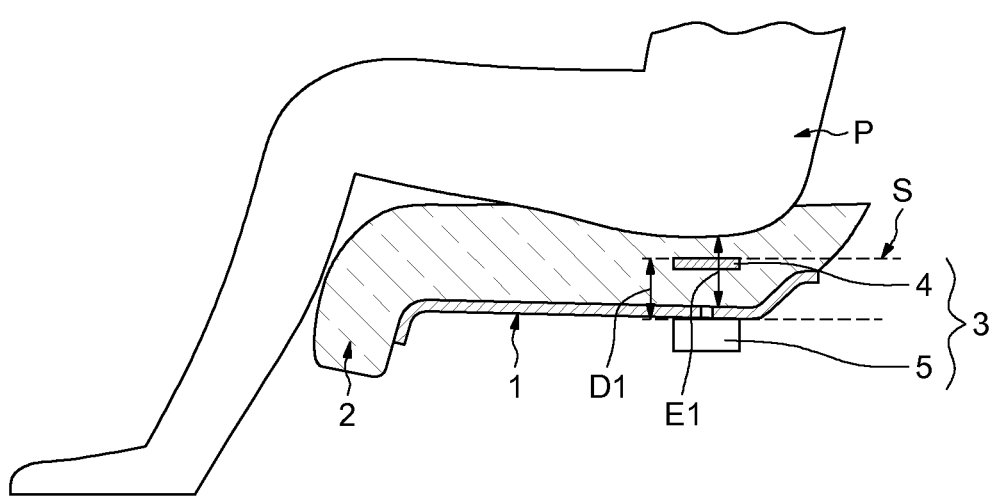
FIG. 1 illustrates a seat of a seat in good condition incorporating a device for detecting wear according to a first embodiment of the invention.
Figure 2:
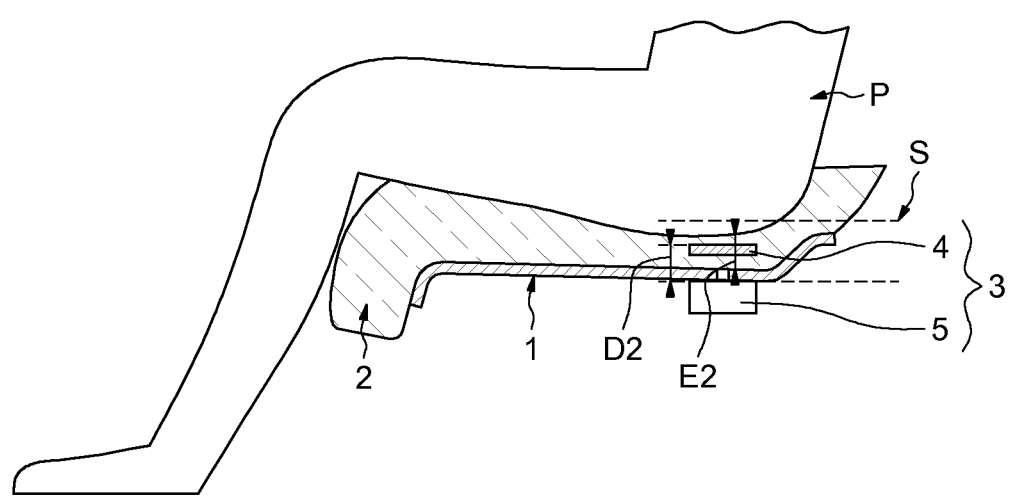
FIG. 2 illustrates a seat of a seat in worn condition incorporating a device for detecting wear according to a first embodiment of the invention.

FIGS. 1 and 2 illustrate an aircraft seat comprising a seat 1 comprising a cushion 2, whereon a passenger P is sitting. The cushion 2 is represented in FIGS. 1 and 2, in good and then worn condition respectively.

In the illustrated examples, the detection of the wear of the cushion of the seat 1 of the seat will therefore be considered. Obviously, the invention also applies to detecting the wear of a cushion disposed on the backrest of the seat, or of any other cushion of a seat that can be worn.

Obviously, the invention may also be applied to any other type of seat such as, for example, a motor vehicle seat or any other land or air transport vehicle, train, bus seat, for which autonomous wear detection is particularly advantageous.

The seat illustrated incorporates a device for detecting wear intended to monitor the state of wear of the cushion 2. This device is advantageously used when a passenger is sitting on the cushion.

Wear denotes the collapse of the cushion 2, i.e., the reduction in the thickness thereof, below a minimum thickness threshold value for which the cushion 2 is considered to no longer fulfil the passenger comfort function thereof.

The detection device includes means 3 for determining the thickness of the cushion 2.

Determining the state of wear by the determining means 3 is carried out according to a minimum threshold value S of the thickness for the cushion 2. This minimum value S is predetermined and corresponds to a comfort threshold S. Tests may be conducted in order to determine the comfort threshold S, i.e., in order to determine from which thickness value of the cushion 2 the latter is considered to no longer fulfil the comfort function thereof for the passenger P.

In other words, when the value of the thickness of the cushion 2 is less than the predetermined minimum threshold value, the cushion 2 is considered to be worn and uncomfortable. A replacement of the cushion 2 is to be envisaged.

On the other hand, for a cushion thickness value greater than or equal to the minimum threshold value, the cushion 2 is considered to be new or in good condition and to provide the comfort function thereof.

In the illustrated examples, the determining means 3 comprise a sensor and an element to be detected by the sensor. The element to be detected is disposed in the cushion 2 and the sensor is, preferably, fastened to the seat 1, for example under the seat 1, facing the element to be detected.

In the first embodiment, the element to be detected is a magnet 4 and the sensor is a sensor sensitive to the magnetic field of the magnet, reacting according to the proximity of the magnet 4.

Preferably, the sensor is a Hall effect sensor 5.

In FIG. 1, the cushion illustrated is a cushion that is new or in good condition. In the new state, the element to be detected, here the magnet 4, is disposed at an initial position inside the cushion 2 and the magnetic field of the magnet 4 perceived by the Hall effect sensor 5 has an initial value.

Preferably, the initial position of the element to be detected coincides advantageously with the comfort threshold S, i.e., the element to be detected is disposed in the vertical plane through the comfort threshold S. The distance between the element to be detected and the sensor is an initial distance D1.

With reference to FIG. 2, in the worn state, the magnet moves away from the initial position thereof. The element to be detected is then positioned at a distance D2 less than the initial distance D1.

The sensor detects the approach of the element to be detected in relation to the sensor, at a distance indicating a collapse of the cushion 2, where the thickness of the collapsed cushion 2 is less than the predetermined minimum threshold value S.

The value of the magnetic field of the magnet 4 perceived by the Hall effect sensor 5 is greater than the initial value in the configuration of FIG. 1, given the greater proximity between the magnet 4 and the Hall effect sensor 5. The Hall effect sensor 5 reacts to this approach of the magnet 4.

The value of the magnetic field detected by the sensor makes it possible to infer the thickness of the cushion 2 and therefore the state of wear thereof, by comparison with the comfort threshold S.

The sensor and element to be detected assembly of the determining means 3 is a low electrical consumption assembly enabling the autonomous detection of the state of wear of the cushion 2.

Advantageously, the device for detecting wear can comprise a transmission box, not shown, capable of transmitting the signal from the sensor to an aircraft cabin management system, in order to indicate to the cabin crew that the cushion 2 is worn and must be replaced. Transmission can be carried out in wired or non-wired mode. In a non-wired mode, the transmission protocol can be Bluetooth, BLE, Lora, Sigfox, Zigbee, Wi-Fi or any other low energy consumption transmission protocol.

Obviously, if the detection device is disposed in a seat other than an aircraft seat, the signal may be transmitted to an adapted management system. For example, for a motor vehicle seat, the signal may be transmitted in such a way as to receive an indication of the wear of the cushion 2 on the dashboard.

Figure 5:
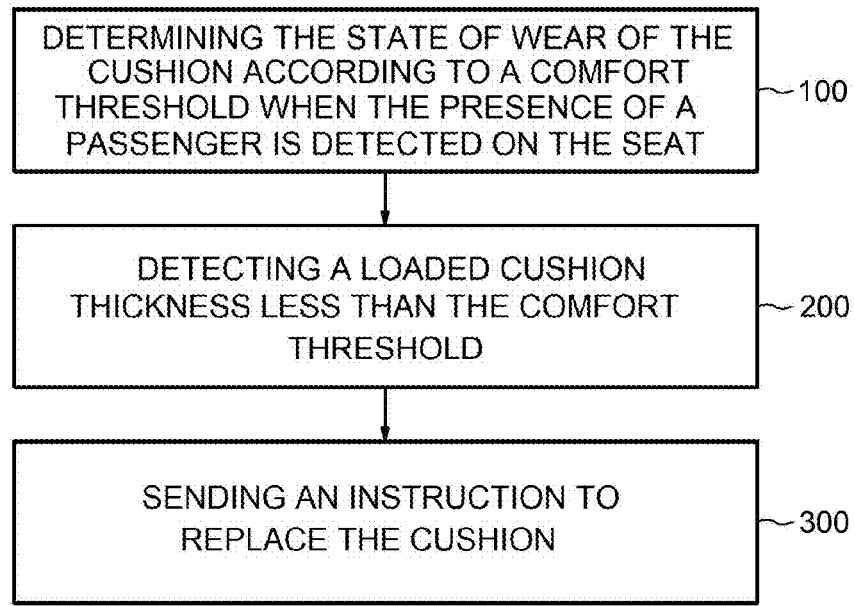
FIG. 5 illustrates the steps of a method for detecting the wear of a cushion of the seat of a seat according to the invention.

With reference to FIG. 5, the device for detecting wear described functions as follows.

During a first step 100, determining the state of wear of the cushion 2 by the device for detecting wear according to the predetermined minimum threshold value S of the thickness of the cushion 2 below which the cushion 2 is considered to be worn.

The step of determining 100 of the method for detecting the state of wear of the cushion 2 comprises detecting an element to be detected, disposed in the cushion 2, at a distance from a sensor indicating a collapse of the cushion 2, the thickness whereof is less than the predetermined minimum threshold value S.

During a first step, detection of a passenger detected on the seat firstly takes place.

If this is the case, the sensor 5 determines the position of the magnet 4. In the illustrated example, the sensor and the element to be detected correspond respectively to the magnet 4 and to the Hall effect sensor 5.

However, according to an embodiment, determining the state of wear of the cushion 2 can be performed with no load, i.e., when no passenger P is sitting on the seat 1. In this case, wear denotes the collapse of the cushion 2 with no load.

Preferably, and as illustrated, determining the state of wear of the cushion 2 is performed when the seat is loaded, i.e., when a passenger P is sitting on the seat. In this case, wear denotes the collapse of the cushion 2 when loaded.

It is more difficult to detect the geometry of the cushion 2 with no load given the small variations in thickness and the complex measurement of the time for the foams to return to the off-load thickness thereof. With no load, a cushion does not return to the initial shape thereof or returns slowly thereto.

When the cushion is worn, the constituent foams thereof are crushed more easily than when new, such that the thickness variations between a cushion in good condition and a worn cushion are greater loaded than with no load. Determining the state of wear is thus facilitated when the cushion 2 is loaded.

The thickness determined by the detection device, such as the thickness E1 of a cushion 2 in good condition or the thickness E2 of a worn cushion 2, respectively illustrated in FIGS. 1 and 2, are thicknesses of the cushion 2 when a passenger P is sitting on the seat, i.e., the thickness of the cushion 2 remaining loaded.

In the illustrated example, the minimum threshold value S of the thickness of the cushion 2 is therefore considered when a passenger is sitting on the seat.

The operation of the means 3 for determining the thickness of the cushion 2 may then advantageously be adapted to be dependent on the presence of a person sitting on the seat. In this regard, the detection device illustrated comprises means for detecting the presence of a person on the seat.

In the illustrated example, the Hall effect sensor 5 makes it possible to define different detection levels according to the value of the magnetic field corresponding to the distance between the magnet 4 and the Hall effect sensor 5. The Hall effect sensor 5 and magnet 4 assembly may be used, according to a first level, to detect the presence of a passenger P on the seat then, according to second level, to detect the wear of the cushion 2.

Advantageously, when the detection device detects, in a step 200, a cushion 2 thickness, loaded, less than or equal to the comfort threshold S associated with a worn cushion 2, the detection device can send, in a successive step 300, an instruction signaling that the cushion 2 is worn and an instruction to replace the cushion 2.

Preferably, the state of wear of the cushion 2 is determined several times in a predetermined time interval. Preferably, the state of wear is determined several times in one day. This makes it possible to reflect the state of wear of the cushion 2 independently of the body type of the passengers P, i.e., regardless of their height or their size.

A cushion 2 may thus be considered to be worn when the comfort threshold S has been exceeded several times in a predetermined time interval such as, in this case, one day.

According to a further embodiment, the Hall effect sensor 5 may be replaced by another sensor sensitive to the magnetic field or to a metal such as a reed switch or by a capacitive sensor.

Figure 3:
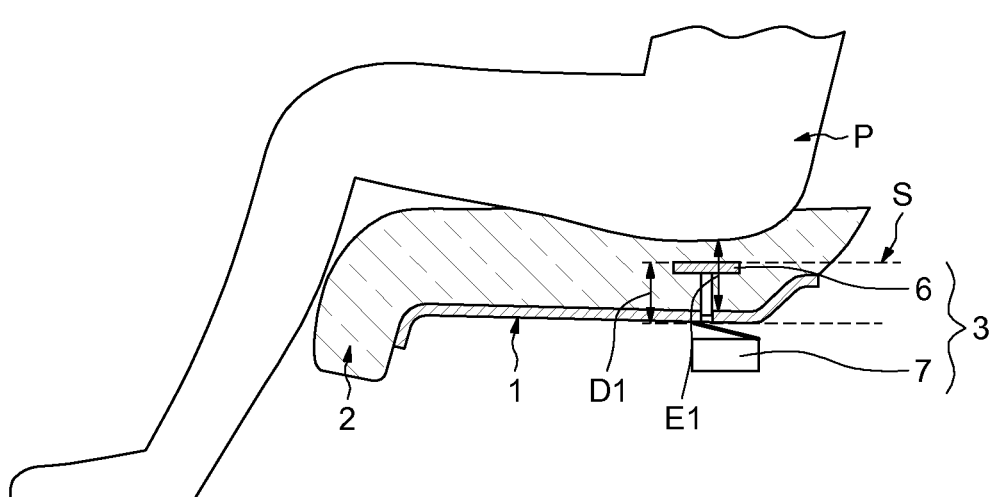
FIG. 3 illustrates a seat of a seat in good condition incorporating a device for detecting the wear of the cushion according to a second embodiment of the invention.
Figure 4:
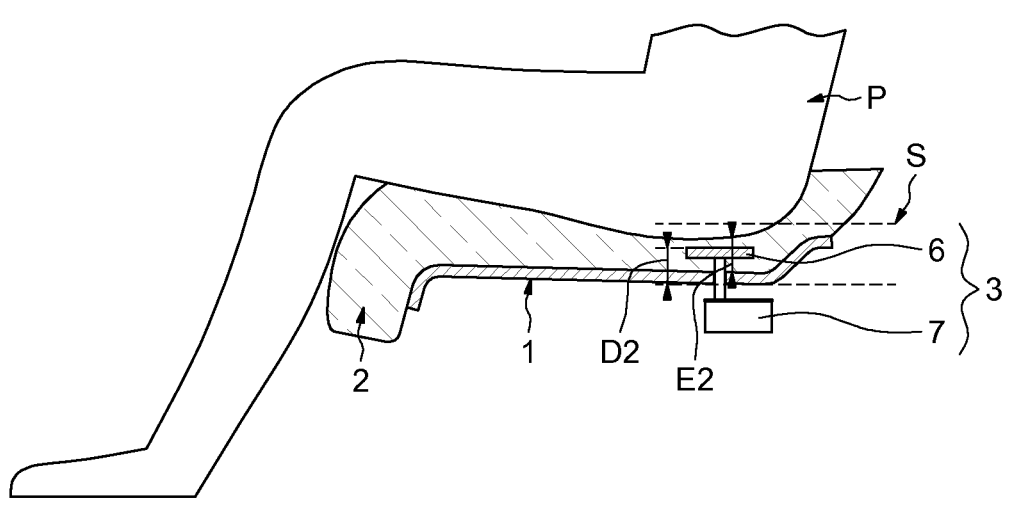
FIG. 4 illustrates a seat of a seat in worn condition incorporating a device for detecting wear according to a second embodiment of the invention.

In a second embodiment illustrated in FIGS. 3 and 4, the element to be detected is a mechanical part 6 and the sensor is an electromagnetic sensor 7 reacting according to the proximity of the mechanical part.

The sensor illustrated is a mechanical switch 7 and the element to be detected is a plate.

The mechanical part 6 is initially disposed in the cushion 2 that is new or in good condition of the seat, illustrated in FIG. 3, at a distance D1 from the mechanical switch 7 remaining in the open position.

As illustrated in FIG. 4, when the thickness of the loaded cushion 2 is less than the predetermined minimum threshold value S, the mechanical part 6 is at a distance D2 wherein it comes into direct contact with the mechanical switch 7 which is then switched to the closed position.

The closed position of the mechanical switch 7 is associated with a worn state of the cushion 2.

The detection method illustrated makes it possible, via reliable, inexpensive means easy to integrate in a seat, to predict or detect by direct measurement the wear of a cushion.

The invention claimed is:

1. Method for detecting a state of wear of a cushion of a seat or a backrest of a seat, comprising determining the state of wear of the cushion according to a predetermined minimum threshold value of a thickness of the cushion below which the cushion is considered to be worn, determining the wear of the cushion being carried out when a presence of a person on the seat is detected, determining the state of wear of the cushion comprising
      detecting an element to be detected disposed in the cushion at a distance from a sensor indicating the thickness of the cushion less than the predetermined minimum threshold value,
   the element to be detected being a magnet and the sensor being a sensor sensitive to a magnetic field of the magnet and reacting according to the proximity of the magnet, the sensor being used according to a first detection level to detect a presence of a passenger on the seat, and according to a second detection level to detect the wear of the cushion according to the value of the magnetic field corresponding to the distance between the magnet and the sensor.

2. Method according to claim 1, characterized in that the method can comprise sending an item of information signaling that the cushion is worn when a thickness value of the cushion less than a predetermined minimum threshold value is detected in a predetermined time interval.

3. Seat comprising a cushion of a backrest or a seat of the seat and a device for detecting a state of wear of the cushion, the detection device including means for determining a thickness of the cushion according to a predetermined minimum threshold value of the thickness of the cushion below which the cushion is considered to be worn, the device for detecting the state of wear of the cushion further comprises means for detecting a presence of a person on the seat, the operation of the means for determining the thickness of the cushion being dependent on the presence of a person sitting on the seat, the means for determining the thickness of the cushion including a sensor capable of detecting when an element to be detected disposed in the cushion is at a distance indicating a thickness of the cushion less than a predetermined minimum threshold value,
   the element to be detected being a magnet and the sensor being a sensor sensitive to a magnetic field of the magnet and reacting according to the proximity of the magnet, and the determining means being configured to detect the presence of a passenger on the seat according to a first detection level, and to detect the state of wear of the cushion according to a second detection level according to the value of the magnetic field corresponding to the distance between the magnet and the sensor.

4. Seat according to claim 3, wherein the sensor is a Hall effect sensor.

5. Seat according to claim 3, characterized in that the element to be detected is a mechanical part and the sensor is an electromagnetic sensor reacting according to the proximity of the mechanical part.

6. Seat according to claim 3, characterized in that the sensor is fastened at the seat of the seat.

7. Aircraft including at least one seat according to claim 3.

* * * * *